(12) United States Patent
Kim

(10) Patent No.: US 12,051,956 B2
(45) Date of Patent: Jul. 30, 2024

(54) VIBRATION MODULE WITH A FLOW HOLE PROVIDING AIR PRESSURE DURING A MODULE VIBRATION

(71) Applicant: Dae Yun Kim, Wonju-si (KR)

(72) Inventor: Dae Yun Kim, Wonju-si (KR)

( * ) Notice: Subject to any disclaimer, the term of this patent is extended or adjusted under 35 U.S.C. 154(b) by 301 days.

(21) Appl. No.: 17/608,982

(22) PCT Filed: May 11, 2020

(86) PCT No.: PCT/KR2020/006161
§ 371 (c)(1),
(2) Date: Nov. 4, 2021

(87) PCT Pub. No.: WO2020/231122
PCT Pub. Date: Nov. 19, 2020

(65) Prior Publication Data
US 2022/0216778 A1 Jul. 7, 2022

(30) Foreign Application Priority Data

May 10, 2019 (KR) .................... 10-2019-0054619

(51) Int. Cl.
*H02K 33/02* (2006.01)
*A61H 23/02* (2006.01)

(52) U.S. Cl.
CPC .......... *H02K 33/02* (2013.01); *A61H 23/0218* (2013.01); *A61H 2201/0214* (2013.01); *A61H 2201/105* (2013.01)

(58) Field of Classification Search
CPC .......... H02K 33/02; H02K 33/18; B06B 1/04; B06B 1/045; A61H 2201/0214; A61H 2201/105; A61H 2201/025
See application file for complete search history.

(56) References Cited

U.S. PATENT DOCUMENTS

| 3,968,789 A * | 7/1976 | Simoncini .............. A46B 13/04 601/95 |
| 2016/0235621 A1 | 8/2016 | Choe |
| 2018/0245575 A1* | 8/2018 | Yoshihara ............. F04B 39/127 |

FOREIGN PATENT DOCUMENTS

| JP | 2002-066457 A | 3/2002 |
| JP | 2016518898 A * | 6/2016 |
| KR | 20-0252198 Y1 | 11/2001 |
| KR | 20-0271849 Y1 | 4/2002 |
| KR | 10-2011-0000904 A | 1/2011 |
| KR | 10-2014-0020744 A | 2/2014 |
| KR | 10-1487323 B1 | 1/2015 |

OTHER PUBLICATIONS

Im, Machine Translation of JP2016518898, Jun. 2016 (Year: 2016).*
International Search Report for PCT/KR2020/006161 mailed Aug. 13, 2020 from Korean Intellectual Property Office.

* cited by examiner

*Primary Examiner* — Eric Johnson
(74) *Attorney, Agent, or Firm* — Revolution IP, PLLC

(57) ABSTRACT

The present invention relates to a vibration module and, more specifically, to a vibration module provided with a flow hole therein such that the body is pressurized via air flow during a module vibration process to increase a body stimulation effect, the inside of the module can cooled down, and moreover, a substance such as drug is injected into the body or a substance (waste, fat, etc.) discharged from the body is discharged to the outside in order to improve a therapeutic effect.

6 Claims, 4 Drawing Sheets

VIBRATION MODULE WITH A FLOW HOLE PROVIDING AIR PRESSURE DURING A MODULE VIBRATION

FIELD OF THE DISCLOSURE

The present disclosure relates to a vibration module and, more specifically, to a vibration module provided with a flow hole therein such that the body is pressurized using flow of air or a substance during a module vibration process to increase a body stimulation effect, the inside of the module can cooled down, and moreover, a substance such as drug is injected into the body or a substance (waste, fat, etc.) discharged from the body is discharged to the outside in order to improve a therapeutic effect.

Further, the present disclosure relates to a vibration module that can cool an LED or a high-frequency, low-frequency, or thermoelectric semiconductor and can function as a passage for water for cooling to give a function to a head that transmits vibration using the flow hole.

RELATED ART

A human body naturally ages over time, so pain is naturally generated and activity thereof is limited by injury due to partial degeneration. Further, various diseases such as brain damage, cardiosclerosis, arteriosclerosis, and arthritis are caused by limitation in activity accompanying industrial and technological development, and various complications due to not only simple damage such as a car accident, an industrial disaster, sports damage, activity damage, but stress, lack of exercise, and corpulence.

Not only medicines, but various body stimulation devices have been developed and used with functional food to treat pain, injury, corpulence, etc. that are generated by such natural phenomenon of a human body or social and cultural issues. In general, such stimulation devices generate vibration using a vibration module and a stimulator (a massage head, etc.) coupled to the vibration module vibrates and stimulates a human body, whereby relaxing muscles and reducing fatigue of nerves. A vibration type that uses a motor or a vibration speaker is applied to the vibration module for generating vibration.

Further, vibration is used not only for stimulation of a human body, but cultivation of cells and substances, which is included in the field of inducing changes of various substances, and even home appliances, so there is a need for an advanced vibration technology that can transmit quantified frequency and intensity of vibration and various voice signals.

According to a vibration module that uses a motor, not only it is difficult to adjust an amplitude and intensity, but the number of vibration is not variably transmitted, so the vibration type that uses a vibration speaker is being recently actively studied and developed.

A vibration module that uses a vibration speaker generally includes a bobbin having a coil wound thereon to which a current having sound information is applied, a magnet spaced apart from the coil and installed to surround the bobbin, and a vibration plate fixed to the bobbin. When a current having sound information is applied to the coil, a current flows in the magnetic field generated by the magnet and the bobbin with the coil wound thereon vibrates up and down in accordance with Fleming's left hand rule. In this process, the vibration plate fixed to the bobbin also vibrates and vibrates the surface of a stimulator being in contact with a human body, thereby periodically stimulating the human body.

Technologies are developed and applied to various fields through such complement of the vibration technology, but it is required to change the structure of a vibration module to combine other functions with the vibration function, so it is required to develop an improved vibration module to enter the market.

PRIOR ART DOCUMENT

Patent Document (Patent Document 1) Korean Utility Model No. 20-0252198 (2001 Nov. 17)

SUMMARY

The present disclosure provides a vibration module provided with a flow hole therein such that the body is pressurized via air flow during a module vibration process to increase a body stimulation effect, the inside of the module can cooled down, and moreover, a substance such as drug is injected into the body or a substance (waste, fat, etc.) discharged from the body is discharged to the outside in order to improve a therapeutic effect.

Further, the flow hole provides a space that can function as a passage for flow of fluid and can stably transmit various signals.

TECHNICAL SOLUTION

According to an embodiment for achieving the objectives of the present disclosure, there is provided a vibration module including: a body having an internal space; a magnetic member disposed in the body; a bobbin having a hole in which at least a portion of the magnetic member is inserted, having a coil wound on the outer surface thereof, and being moved up and down by a current that is applied to the coil; an elastic plate having a portion coupled to the top of the bobbin and another portion coupled to the top of the body; and a vibrator fixed to the elastic plate and having a longitudinal flow hole therein which passes through the elastic plate, the bobbin, and the magnetic member.

The vibrator may include: a connection shaft passing through the elastic plate, the bobbin, and the magnetic member; a vibration head formed over the connection shaft; and a fixing plate fixing the vibration head to the elastic plate, in which the flow hole may pass through the connection shaft and the vibration head.

An elastic member may be disposed between the elastic plate and the top of the body.

The elastic member may be a C-shaped plate spring.

An O-ring may be disposed between the elastic member and the body.

A hollow shaft guide may be disposed in the magnetic member such that the connection shaft is positioned through the magnetic member.

Advantageous Effects

According to embodiments of the present disclosure, since a vibration module has a flow hole therein, it is possible to increase a body stimulation effect by pressing a human body and cool the inside of a module using air flow during a module vibration process, and it is possible to improve treatment effect by injecting a substance such as drug into a human body and discharging substances (waste, fat, etc.), which are discharged from a human body, to the outside.

The effects of the present disclosure are not limited to those described above and other effects not stated herein may be made apparent to those skilled in the art from claims.

DESCRIPTION OF EXEMPLARY EMBODIMENTS

Figure 1:
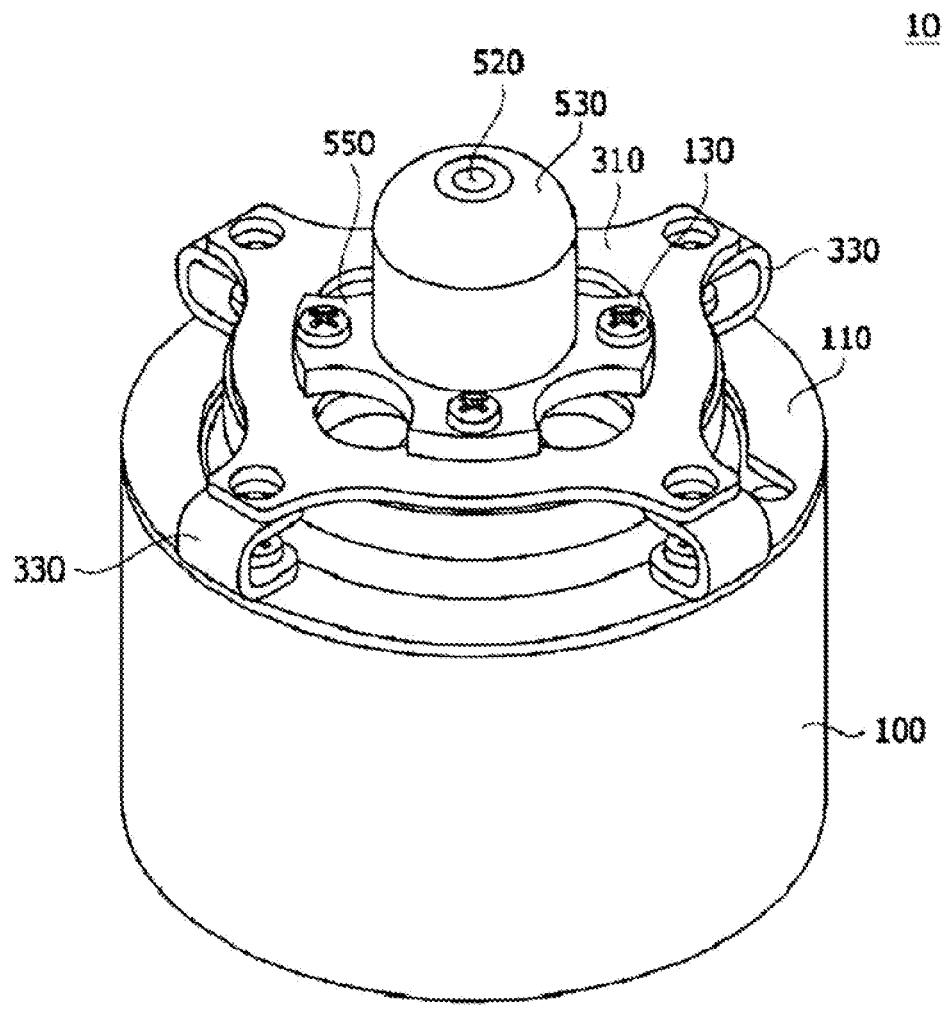
FIG. 1 is a schematic view illustrating a vibration module according to an embodiment of the present disclosure.

The present disclosure may be modified in various ways and implemented by various exemplary embodiments, so that exemplary embodiments will be described in detail herein. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings. Terms used in the specification, 'first', 'second', etc., may be used to describe various components, but the components are not to be construed as being limited to the terms.

The terms are used only to distinguish one component from another component. Terms used in the present specification are used only to describe specific exemplary embodiments rather than limiting the present disclosure. Singular forms are intended to include plural forms unless the context clearly indicates otherwise.

It will be further understood that the terms "comprises" or "composed of" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Hereafter, exemplary embodiments of the present disclosure are described in more detail with reference to the drawings.

Figure 2:
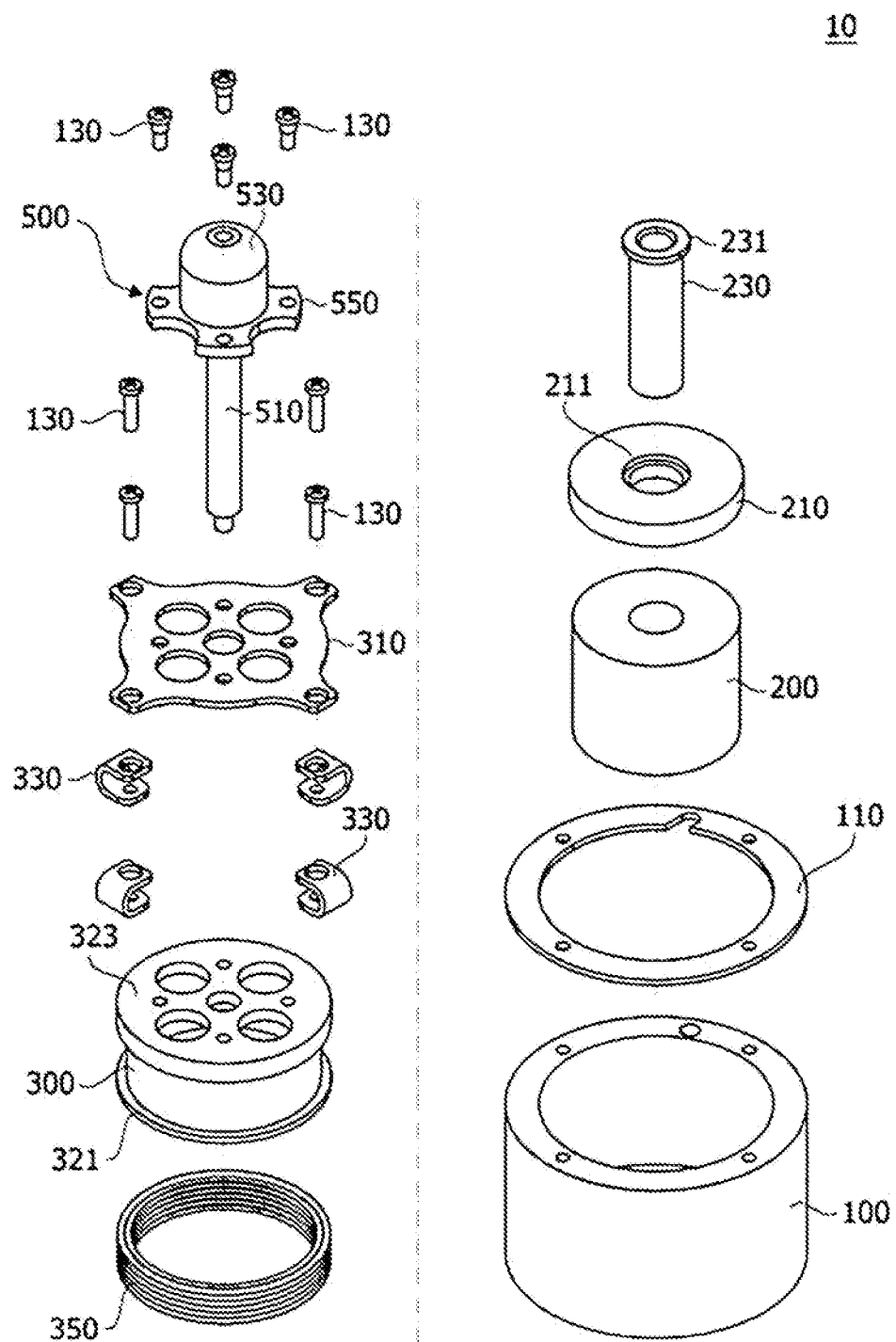
FIG. 2 is an exploded perspective view of the vibration module according to an embodiment of the present disclosure.

FIG. 1 is a schematic view illustrating a vibration module 10 according to an embodiment of the present disclosure and FIG. 2 is an exploded perspective view of the vibration module 10. Referring to FIGS. 1 and 2, a vibration module according to an embodiment of the present disclosure may include a vibration body 100, a magnetic member 200, a bobbin 300, an elastic plate 310, and a vibrator 500.

The body 100 has an internal space. In detail, the body 100 may be formed in a hollow cylindrical shape with an open top.

The magnetic member 200 is disposed in the internal space of the body 100. The magnetic member 200 may be a cylindrical permanent magnet. The magnetic member 200 is disposed at the center in the internal space of the body 100 and generates a magnetic field in which lines of magnetic force are generated around the magnetic member 200. The magnetic member 200 may have a through-hole at the center to pass the vibrator 500 to be described blow.

The bobbin 300 has a hole such that at least a portion of the magnetic member 200 is inserted therein, and a coil 350 may be wound on the outer surface of the bobbin 300.

The bobbin 300 may be formed in a cylindrical shape to correspond to the shape of the magnetic member 200 and may have a hole such that the magnetic member 200 is inserted therein. In detail, the bobbin 300 is positioned on the magnetic member 200 and at least a portion of the magnetic member 200 is inserted in the hole of the bobbin 300. When a current is applied to the coil 350, the bobbin 300 vibrates while moving up and down in the height direction of the magnetic member 200. The bobbin 300 may be made of a nonmetallic material (aluminum, etc.).

The coil 350 is wound on the outer surface of the bobbin 300. In detail, an upper protrusion 323 and a lower protrusion 321 may be formed on the top and the bottom of the bobbin 300, respectively. The coil 350 is wound several times in the groove formed by the upper protrusion 323 and the lower protrusion 321 along the outer surface of the bobbin 300.

Current signals are alternately supplied to the coil 350 from an external power supply, and the bobbin 300 with the coil 350 wound thereon moves up and down in accordance with the alternating current signals. In detail, a magnetic field is generated around the magnetic member 200 disposed in the body 100 and the bobbin 300 with the coil 350 wound thereon is disposed outside the magnetic member 200 and positioned in the magnetic field of the magnetic member 200, whereby when a current signal is applied to the coil 350, Lorentz force is generated and the bobbin 300 is moved. When negative and positive electrical signals are alternately applied to the coil 350, the polarities of the coil 350 are alternately changed, so the bobbin 300 moves (vibrates) up and down. The intensity of the vibration is proportioned to the intensity of current and the number of winding of the coil 350.

As the bobbin 300 moves up and down, the elastic plate 310 and the vibrator 500 that are coupled to the bobbin 300 move up and down, so the vibrator 500 vibrates.

A through-hole (not shown) may be formed at the center of the bobbin 300 to pass the vibrator 500 to be described blow.

A portion of the elastic plate 310 may be coupled to the top of the bobbin 300 and the other portion may be coupled to the top of the body 100. In detail, the elastic plate 310 may be formed in a disc shape, the center portion of the elastic plate 310 is coupled to the bobbin 300, and the edge of the elastic plate 310 is coupled to the body 100. Coupling of a portion of the elastic plate 310 to the bobbin 300 and the other portion of the elastic plate 310 to the body 100 may be made by fasteners 130. In the present disclosure, the fastener 130, which is a part for fastening or fixing one component to another component, may be implemented in various types such as a bolt, a screw, and a rivet. Since a portion of the elastic plate 310 is coupled to the bobbin 300 that moves up and down and the other portion thereof is coupled and fixed to the body 100, the elastic plate 310 is vibrated by movement of the bobbin 300 and the vibrator 500 coupled to the elastic plate 310 vibrates.

A through-hole (not shown) may be formed at the center of the elastic plate 310 to pass the vibrator 500.

An elastic member 330 may be disposed between the elastic plate 310 and the top of the body 100. In detail, a plurality of elastic members 330 is disposed on the top of the body 100 outside the elastic plate 310 and elastically supports the elastic plate 310. The elastic members 300 maximize elasticity when the elastic plate 310 is vibrated by vibration of the bobbin 300, thereby being able to maximize the vibration efficiency of the vibrator 500. The elastic members 330 are disposed between the elastic plate 310 and the body 100, and primarily absorb shock and transmit vibration to the elastic plate 310 when the bobbin 300 vibrates, thereby attenuating shock that is directly applied to the elastic plate 310. Accordingly, it is possible to improve durability of the vibration module 10 by preventing damage to the elastic plate 310 due to fatigue.

The elastic members 330 may be C-shaped plate springs. In detail, the C-shaped plate spring may have a top, a bottom, and a bend, and the bend may be formed outward from the vibration module 10. The top of the C-shaped plate spring is coupled to the elastic plate 310 by a fastener 130 and the bottom of the C-shaped plate spring is coupled to the top of the body 100 by a fastener 130.

When the elastic members 330 are C-shaped springs, up-down vibration of the bobbin 300 can be more effectively transmitted to the elastic plate 310. Although the elastic members 330 are described as C-shaped plate springs in the present embodiment, the present disclosure is not limited thereto and the elastic members 300 may be S-shaped plate springs or the elastic members 330 may be spiral springs and may spirally transmit vibration to the elastic plate 310.

When the elastic member 330 includes a C-shaped plate spring or an S-shaped plate spring, the elastic member may be individually integrally formed with the C-shaped plate spring or the S-shaped plate spring, and if necessary, they may be separately formed.

The vibrator 500 is fixed to the elastic plate 310 and has a flow hole 520 longitudinally formed therein. The vibrator 500 is fixed to the elastic plate 310 and applies vibration stimulation to a human body by vibrating with vibration of the elastic plate 310.

The vibrator 500 may include a connection shaft 510, a vibration head 530, and a fixing plate 550. The connection shaft 510 is formed in a circular pipe shape, has a flow hole 520 at the center, and passes through the elastic plate 310, bobbin 300, and the magnetic member 200. The connection shaft 510 may be formed to pass through the bottom of the body 100.

The vibration head 530 is formed over the connection shaft 510 and has a flow hole 520 at the center. The vibration head 530 can transmit vibration by coming in direct contact with a human body or can be coupled to another vibration device (a head for skin massage, a head for head skin massage, etc.) and can transmit vibration to the vibration device for various massages and stimulations.

The fixing plate 550 protrudes from the vibration head 530 or the connection shaft 510 and is coupled to the elastic plate 310 by fasteners 130, thereby fixing the vibration head 530 to the elastic plate 310.

A vibration head 530 disposed under other than above the connection shaft 510 may be additionally included, and in this case, the module can vibrate in two directions through the vibration heads 530 formed upper and lower portions.

A fixing plate for fixing the vibration head 530 formed at the upper portion to the elastic plate may be additionally included, and the way of fixing the elastic plate and the fixing plate is the same as the description about the elastic plate 310 and the fixing plate 550 included in the same way at the upper portion.

The flow hole 520 of the vibration head 530 and the flow hole 520 of the connection shaft 510 communicate with each other, so air can press a human body by flowing through the flow holes 520 or it is possible to cool the inside of the vibration module 10 using flowing air. Further, it is possible to inject substances such as drug into a human body or discharge substances (waste, fat, etc.) discharged from a human body out of the vibration module 10.

In detail, the connection shaft 510 is inserted in the through-hole (not shown) of the elastic plate 310, the through-hole (not shown) of the bobbin 300, the through-hole (not shown) of the elastic member 200, and the through-hole (not shown) of the body 100, and is coupled to the elastic member 10, the bobbin 300, the magnetic member 200, and the both 100 through theme, so a flow hole 520 of the vibration head 530 and the connection shaft 510 is formed through the vibration module 10. As described above, it is possible to increase the human body stimulation effect and cool the inside of the vibration module 10 using the air that flows through the flow hole 520 formed through the vibration module 10, and it is also possible to improve the treatment effect by injecting an external substance into a human body or discharge substances, which are discharged from a human body, out of the vibration module 10.

An O-ring 110 may be disposed between the elastic members 330 and the body 100. The O-ring 110 may be made of silicone and disposed between the bottoms of the elastic members 330 and the top of the body 100, and can attenuate shock that is applied to the body 100 due to vibration of the bobbin 300.

A shaft guide 230 may be disposed in the magnetic member 200. In detail, the shaft guide 230 is formed in a longitudinally hollow circular pipe shape and is inserted in the through-hole (not shown) of the magnetic member 200, and the connection shaft 510 is inserted in the longitudinal hole. The shaft guide 230 prevents the shaft 510 from tilting left and right by guiding the connection shaft 510 when the connection shaft 510 is moved up and down by vibration of the bobbin 300, thereby improving the property of straight motion of the vibrator 500. The shaft guide 230 may be made of a low-friction material such as a material containing graphite to prevent friction between the connection shaft 510 and the shaft guide 230.

A coupling plate 210 is coupled to the magnetic member 200. The coupling plate 210 has a shape that is substantially similar to the top of the magnetic member 200, is disposed on the magnetic member 200, and is installed adjacent to the bottom of the bobbin 300. The coupling plate 210 prevents a loss of the magnetic field generated by the magnetic member 200 by inducing and focusing the magnetic force of the magnetic member 200 to the coil 350.

A through-hole (not shown) is formed at the coupling plate 210 to communicate with the through-hole (not shown) of the magnetic member 200, and the shaft guide 230 is inserted in the coupling plate 210 and the magnetic member 200 through the through-hole (not shown).

In detail, a stepped portion 231 protrudes from the top of the shaft guide 230 and a fixing groove 211 corresponding to the stepped portion 231 is formed at the coupling plate 210. Accordingly, the stepped portion 231 of the shaft guide 230 is seated in the fixing groove 211 of the coupling plate 210, whereby the shaft guide 230 is fixed to the coupling plate 210. The shaft guide 230 guides the connection shaft 510 such that the vibrator 500 does not tilt when the vibrator 500 vibrates, and it is possible to prevent the problem of damage to the vibrator 500 due to accumulation of fatigue by preventing the vibrator 500 from tilting.

Figure 3A:
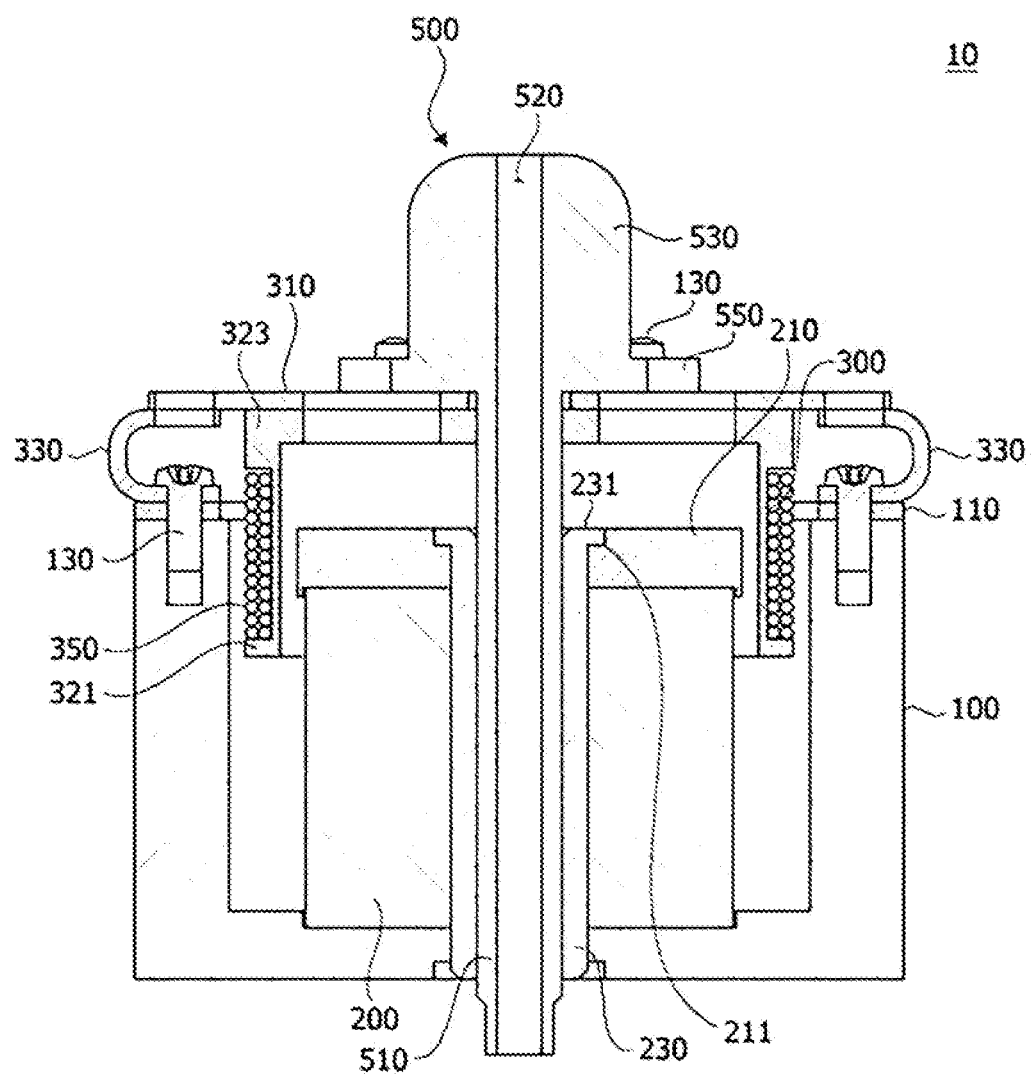
FIGS. 3A and 3B are reference views illustrating a vibration process of the vibration module according to an embodiment of the present disclosure.
Figure 3B:
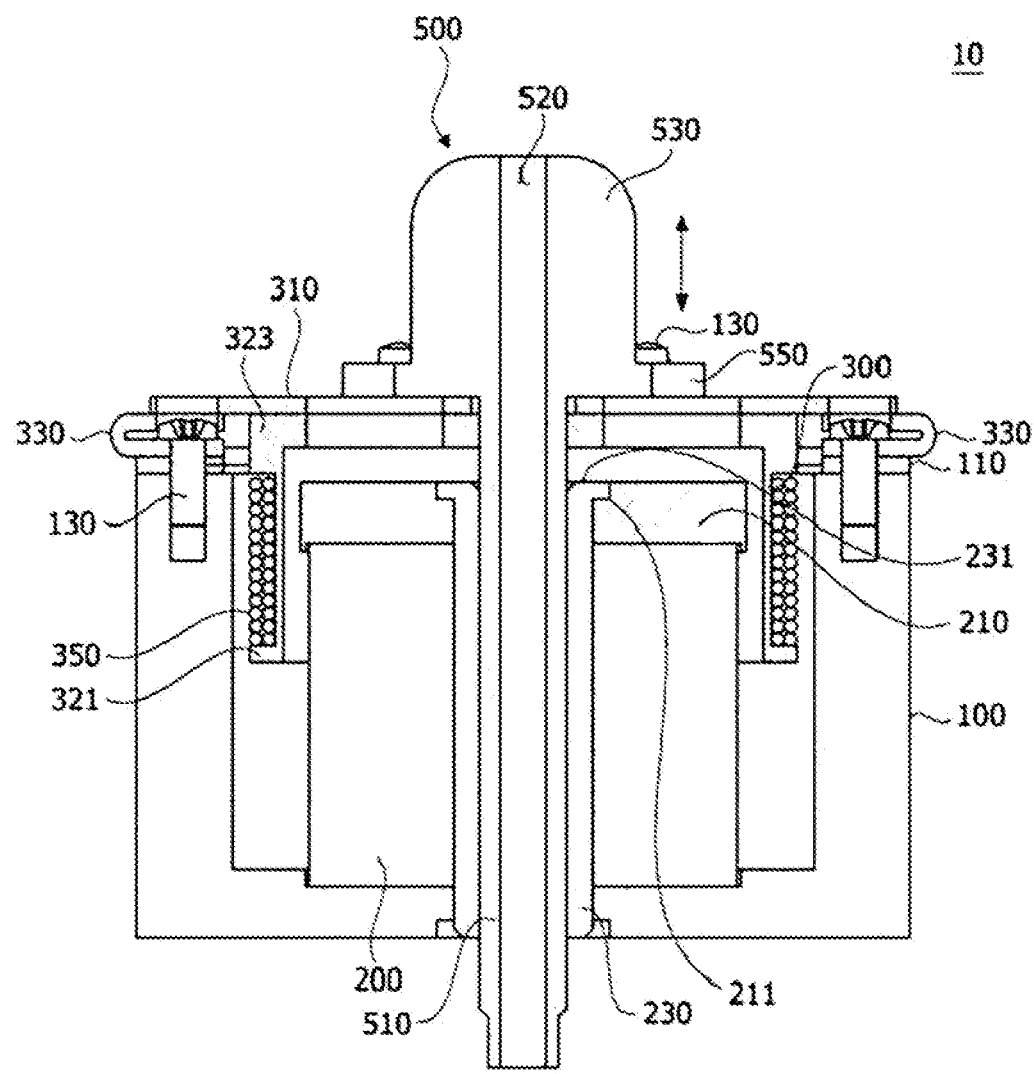

Hereafter, the vibration process of the vibration module 10 according to an embodiment of the present disclosure is described with reference to FIGS. 3A and 3B. When a current is applied to the coil 350 positioned in the magnetic field of the magnetic member 200 in the initial state (FIG. 3A), the bobbin 300 is moved down by Lorentz force (FIG. 3B). Thereafter, when an opposite current is applied to the coil 350, an opposite force is applied, so the bobbin 300 is moved up into the initial state (FIG. 3A). The bobbin 300 vibrates up and down by repeating this process, and the elastic plate 310 coupled to the bobbin 300 and the vibrator 500 coupled to the elastic plate 310 vibrate up and down. Since the vibrator 500 has a flow hole 520, air can flow or external substances can be moved through the flow hole 520 during the vibration process.

As described above, since the vibration module 10 according to an embodiment of the present disclosure includes vibrator 500 having the flow hole 520 formed through the body 100, the magnetic member 200, the shaft guide 230, and the bobbin 300, when the vibration module 10 vibrates, air can flow through the flow hole 520 and press a human body or cool the inside of the vibration module 10. Further, it is possible to inject a substance such as drug into a human body and it is possible to discharge substances, which are discharged from a human body, out of the vibration module 10.

Further, since the C-shaped plate springs are disposed between the elastic plate 310 and the body 10, movement of the bobbin 300 is more effectively transmitted to the elastic plate 310, so the vibration effect of the vibration module 10 can be improved.

Further, since the shaft guide 230 that guides straight movement of the connection shaft 510 is disposed in the magnetic member 200, the vibrator 500 vibrates without tilting when the bobbin 300 vibrates, whereby it is possible to prevent the problem of damage to the vibrator 500 due to accumulation of fatigue.

Although the present disclosure was described above with reference to exemplary embodiments, it should be understood that the present disclosure may be changed and modified in various ways by those skilled in the art, without departing from the spirit and scope of the present disclosure described in claims.

DESCRIPTION OF REFERENCE NUMERALS

10: vibration module
100: body
110: O-ring
130: fastener
200: magnetic member
210: coupling plate
211: fixing groove
230: shaft guide
231: stepped portion
300: bobbin
310: elastic plate
321: bobbin lower protrusion
323: bobbin upper protrusion
330: elastic member
350: coil
500: vibrator
510: connection shaft
520: flow hole
530: vibration head
550: fixing plate

What is claimed is:

1. A vibration module comprising:
a body having an internal space;
a magnetic member disposed in the body;
a bobbin having a hole in which at least a portion of the magnetic member is inserted, having a coil wound on the outer surface thereof, and being moved up and down by a current that is applied to the coil;
an elastic plate having a portion coupled to the top of the bobbin and another portion coupled to the top of the body; and
a vibrator fixed to the elastic plate and having a longitudinal flow hole therein which passes through the elastic plate, the bobbin, and the magnetic member,
the vibrator comprising:
a connection shaft passing through the elastic plate, the bobbin, and the magnetic member;
a vibration head formed over the connection shaft; and
a fixing plate fixing the vibration head to the elastic plate, wherein the fixing plate is positioned to encircle a lower end perimeter of the vibration head,
wherein the longitudinal flow hole passes through the connection shaft and the vibration head,
wherein one end of the longitudinal flow hole is in line with one end of the vibration head, and the other end of the longitudinal flow hole is in line with one end of the connection shaft, wherein an entire perimeter of the longitudinal flow hole is same.

2. The vibration module of claim 1, wherein an elastic member is disposed between the elastic plate and the top of the body.

3. The vibration module of claim 2, wherein the elastic member further includes a C-shaped or S-shaped plate spring.

4. The vibration module of claim 3, wherein the elastic member is formed integrally with or separately from the C-shaped or S-shaped plate spring.

5. The vibration module of claim 2, wherein an O-ring is disposed between the elastic member and the body.

6. The vibration module of claim 1, wherein a hollow shaft guide is disposed in the magnetic member such that the connection shaft is positioned through the magnetic member.

* * * * *